Jan. 11, 1927.

F. E. COMSTOCK

AUTOMATIC LINE GUIDE

Filed April 16, 1925

1,614,104

Frederick E. Comstock, Inventor

N. S. Amstutz

By

Attorney

Patented Jan. 11, 1927.

1,614,104

UNITED STATES PATENT OFFICE.

FREDERICK E. COMSTOCK, OF VALPARAISO, INDIANA.

AUTOMATIC LINE GUIDE.

Application filed April 16, 1925. Serial No. 23,630.

My invention relates to improvements in fishing takle and it more especially consists of the features pointed out in the annexed claims.

The purpose of my invention is to provide an automatic line shifting device that is entirely disconnected from the reel; that will lead the line successively to the right and left whether it is being cast or reeled; that operates only through the movement of the line itself; that being independent of the reel it has no train of gears, etc., connected to the usual reel winding crank; and that produces practical results analogous to those secured by "thumbing", shifting the reel itself, etc.

With these and other ends in view, I illustrate in the accompanying drawing such an instance of adaptation as will disclose the broad underlying features without limiting myself to the specific details of construction shown thereon and described herein.

In practically carrying out my invention I may use any cooperating expedients which will, independently of the reel itself, successively lead the fishing line to the right, reverse to the left and reverse again to the right so as to wind the line on the reel in an approximately level and automatic manner, the only driving means being the line itself.

Figure 1:
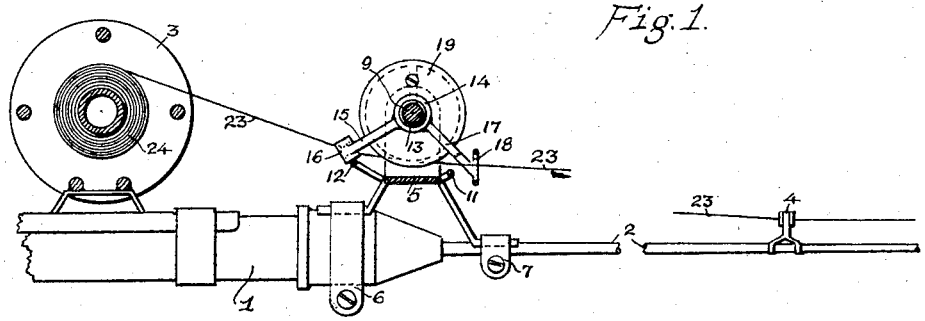
Fig. 1 is a side elevation partly in section.
Figure 2:
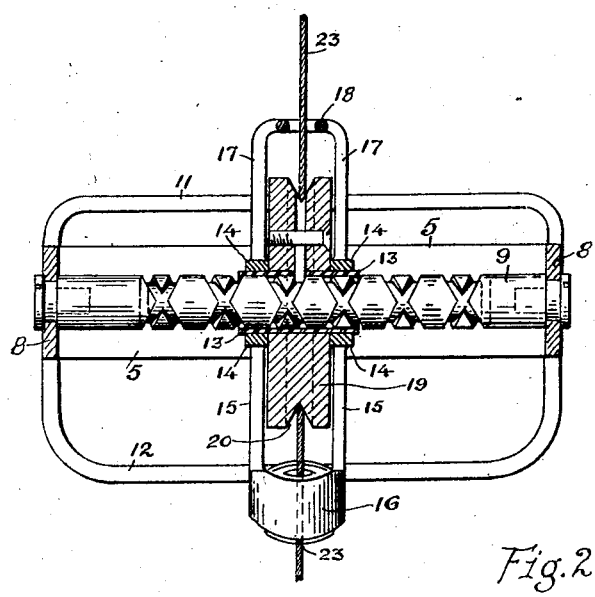
Fig. 2 is an enlarged plan view of Fig. 1.

My device is attachable to practically any standard type of pole 2 which has a handle portion 1 on which a reel 3 is mounted. An agate line guide 4 is secured to the pole as shown in Fig. 1. The line shifting device comprises a base 5 provided with feet that are clamped to the pole 2 by a clamp 7 and to the handle 1 by the clamp 6.

The base 5 has upturned ears 8 in which the spindle 9 is secured. This spindle stands crosswise of the pole and approximately parallel with the reel axis though absolute parallelism is not necessary to the successful operation of my device. In the spindle two oppositely-handed threads or grooves 22 are formed. These grooves near the ends of the spindle are joined by grooves 10 which serve to reverse the traverse of the line disk 19 as it is rotated by the movement of the line 23 while it is wound on the bobbin 24 of the real 3, or is unwound therefrom as the line is cast.

Horizontal guards 11 and 12 are attached to the ears 8 to prevent the slack of the line becoming tangled. The guard wire 12 is placed on the "reel side" of the device and the wire guard 11 is placed on the pole side.

The aluminum disk 19 has a line groove 20 formed in its periphery. It is mounted on a bronze sleeve 13 or a sleeve made of any desired anti-friction or self lubricating material. This sleeve slides on the stationary spindle 9 as the pin 21 slides in the grooves 22 during the rotation of the disk 19. If found desirable, the spindle 9 may also be made of non-rusting material. The pin 21 is placed in the disk 19 in a radial direction and it is held in place in any suitable manner.

Between the spindle 9 and the reel 3 a hinged-agated guide 16 is placed. It is pivoted on the projecting ends of the tube 13 by means of rings 14 which are attached to the agate holder 16 by side arms 15. On the opposite side of the spindle 9 extensions 17 project from the rings 14 and are joined at 18 by a loop having a vertical opening.

The agate guide 16 is free to move up and down as needed. At all times during the operation of the line the guide 16 insures a contact between the line and the disk, thus the line serves as the "drive" by means of which my device is operated.

As shown in the drawing the line 23 passes beneath the disk or sheave 19 and when the line is being cast the guide 16 automatically drops against the wire stop 12 thus partially relieving the line friction which prevents the line becoming slack as it leaves the reel. As the line is being wound the guide 16 is automatically raised from the stop 12 thus putting more tension on the line in contact with the disk 19.

The disk 19 may be made of aluminum or any other light-weight material. Its location in advance of the reel prevents the accumulation of water on the wound-up coils of the line on the reel and in addition the line is cleaned each time it is drawn in.

What I claim is:

1. In fishing tackle, a rotatable and endwise sliding disk, a spindle therefor, and a plurality of self adjusting line guides located below the spindle carried to and fro by the endwise movement of the disk.

2. In fishing tackle, a rotatable and reversibly endwise sliding disk, a spindle therefor having right and left hand threads thereon to cooperate with a radial projection on the disk, self-adjusting line guides having bearing on the disk adapted to be carried to and fro by the endwise movement of the disk, and means placed between the line guides below the spindle to limit the rotative movement of the guides.

3. In fishing tackle, a grooved wheel driven by the fishing line, a right and left hand threaded non-rotatable spindle on which the disk automatically slides endwise in a reversible manner while the same is being rotated in one direction, a support for the spindle, means on the support for attaching the same to a fishing rod, a pair of line guides free to move around the center of the spindle one of the guides being positioned in front of the disk and the other guide being located at the rear of the disk, and means on the frame parallel to the spindle adapted to prevent excessive movement of the line guides.

4. In fishing tackle, a rotatable and endwise sliding disk, a pair of line guides joined by a bearing member rotatable around the axis of the disk and independently thereof said guides bing placed below the center of the disk, a spindle for the disk, a frame for the spindle, and means on the frame located between the line guides adapted to limit the free movement of the guides around the axis of the disk.

5. In fishing tackle, a rotatable and endwise slidable grooved disk, and self-adjusting means located fore and aft of the disk and below the center thereof adapted to automatically control the tension of the fishing line in the annular groove of the disk.

6. In fishing tackle, a winding reel having means for attaching the same to a pole, a line control having means for securing the same to the pole independently of the reel said line control comprising a rotatable and endwise slidable grooved disk, a spindle therefor having right and left hand threads, a radial projection from the disk into the threads of the spindle, and self-adjusting means located below the spindle for automatically varying the tension of the fishing line in the groove of the disk.

In testimony whereof I affix my signature.

FREDERICK E. COMSTOCK.